Figure 1:
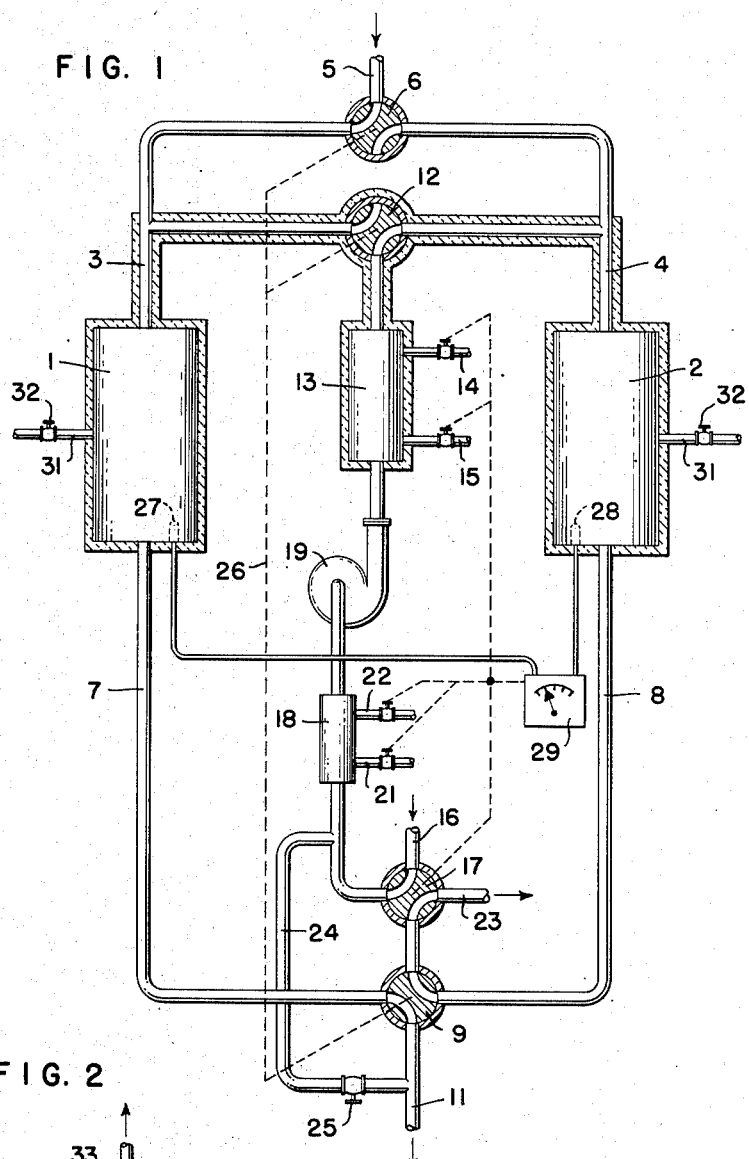

Jan. 18, 1955    R. S. VAN NOTE    2,699,837

DEHYDRATOR

Filed July 11, 1951

INVENTOR.
RICHARD S. VAN NOTE
BY
ATTORNEY.

United States Patent Office 2,699,837
Patented Jan. 18, 1955

2,699,837

DEHYDRATOR

Richard S. Van Note, Baltimore, Md., assignor to Selas Corporation of America, Philadelphia, Pa., a corporation of Pennsylvania Application July 11, 1951, Serial No. 236,105

6 Claims. (Cl. 183—4.7)

The present invention relates to dehydrators, and more particularly to an arrangement of parts for making such apparatus more efficient.

Dehydrators of the type with which this invention is concerned include two drying towers, each of which is filled with a desiccant or drying agent such as silica gel or activated alumina. The towers are each provided with an inlet through which is alternately supplied air to be dried and heated air to reactivate the desiccant after it has completed its drying cycle. Normally, a four-way valve is inserted in the two inlets so that by merely adjusting the valve the air supplies to the two towers can be reversed. This type of construction, while simple, has several drawbacks, the main one of which is the heat exchange through the valve that takes place between the air streams flowing therethrough.

It has been found that the more nearly saturated the air to be dried, the more efficient is the drying action of the dehydrator. If, for example, the air to be dried is 40° F., and saturated approximately 0.15 pound of water will be removed per pound of silica gel. If this same air is heated to 80° F., thus reducing its relative humidity, approximately only 0.07 pound of water will be removed per pound of silica gel. A temperature change of this amount can take place as a result of heat transferred by the valve when hot air in the order of 350° F.— 400° F. used for reactivating the other tower is passing through the same valve. In addition, quite a bit of heat is lost from the hot air, thus increasing the time for the reactivation to take place.

It is an object of the invention to provide a dehydrator in which the supply of air to be dried is separated entirely from the supply of hot air for reactivating the desiccant.

It is a further object of the invention to provide a dehydrator of the type in which the desiccant is reactivated by hot air in which the reactivating and drying cycles of the two towers may be controlled together or independently of each other. Another object of the invention is to provide a dehydrator in which the gas being dried can be used to reactivate the desiccant, or in which another source of gas can be used for this purpose.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 2:
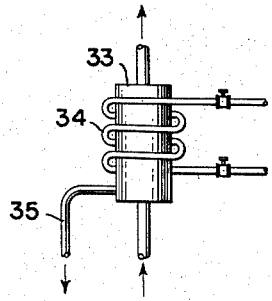

In the drawings:

Figure 1 is a diagrammatic representation of the apparatus forming the invention; and Figure 2 shows another form of cooling mechanism.

Referring to Figure 1, there is shown a diagrammatic representation of a dehydrator comprising the present invention. There are provided two towers 1 and 2, which are filled with a desiccant such as silica gel or activated alumina. The towers each have an inlet 3 and 4 respectively, to one of which a supply of air to be dried is directed from a pipe 5 and a three-way valve 6, depending upon the position of the valve. Each tower is also provided with an outlet 7 or 8 respectively, either of which may be connected by a four-way valve 9 with a discharge pipe 11 for the dry air. The inlet of each tower has a branch extending therefrom to a second three-way valve 12 that can connect either of the inlets with a source of hot air supplied by a heater 13. This heater may be of any conventional type, and may be heated by electricity or by steam, for example. As shown herein, it is intended that the heater be supplied with steam and, as such, has steam coils in it. To this end, there is shown a supply pipe 14 for this steam, and a discharge pipe 15 through which the condensate may be discharged. It is noted that the towers 1 and 2, the heater 13, and the three-way valve 12, as well as the connecting pipes between these parts are all covered with a layer of insulating material. This is for the purpose of retaining heat in the system during the time of the reactivation of the desiccant in the towers.

The air used for reactivation comes through an inlet 16, a four-way valve 17, and a cooler 18 to a blower 19 that is connected with the inlet of the heater. The cooler may be of any desired type, but is here shown diagrammatically as consisting of a container having cooling water coils therein, over which the air flows. To this end, there is provided inlet 21 for the cooling water, and outlet 22. Heated air used in the reactivation of the desiccant travels from the tower through the outlet thereof, and through the four-way valves 9 and 17 to a point of discharge indicated at 23.

There is shown a pipe 24 extending between the dry air discharge 11 and the pipe leading from valve 17 to the cooler 18. This pipe has a valve 25 in it that can be opened to supply dry air to the tower that is being reactivated for purposes set forth below.

The valves 6, 9, and 12 may be operated manually and individually. It is preferred, however, to operate these valves simultaneously so that one tower can be switched from a drying to a reactivating cycle, simultaneously with a reversal to the other tower. For this purpose, each valve is provided with an actuating lever that is shown in dotted lines. These levers are connected by a link 26 so that they may be operated simultaneously. Ordinarily, the link 26 or the valve operating levers are moved manually at the end of a drying period. It will be obvious, however, that the connecting link 26 may be operated automatically after predetermined time periods.

In the reactivating cycle, hot air is first forced through the tower in order to drive the moisture from the desiccant contained therein. After the temperature of the tower has been raised, to a point indicating that all of the moisture has been vaporized and removed, the supply of hot air is cut off, and cold air is blown through the tower to cool the desiccant to operating temperature. In order to determine when the towers have reached the proper temperature, each tower is provided with a temperature response element indicated at 27 and 28 respectively, which elements are connected with a temperature indicating and/or control instrument 29.

In the construction of a dehydrator, it is generally customary to make the towers of such size that each can stay on the drying cycle, for approximately eight hours. Therefore, at the end of each 8 or 9 hour period, or once during each standard work shift, the cycle of the dryer will be reversed so that a tower which has been drying is then reactivated. With the parts in the position shown on the drawing, it will be seen that air to be dried enters the pipe 5, and passes through valve 6 and inlet pipe 3 to the dryer 1. The dry air then flows through outlet pipe 7, and valve 9, to the pipe 11 and point of use. During the time that air is being dried by tower 1, the desiccant in tower 2 is being reactivated.

The reactivating cycle, as noted above, consists of two steps, first heating the desiccant to a temperature sufficient to drive the moisture therefrom, and second, cooling the desiccant to an operating temperature. If the cycle of the dehydrator is eight hours, it will take approximately four hours of heating time for the tower, and approximately four hours' cooling time. For reactivation, air is brought from the surroundings through intake 16 to valve 17. From there it passes through cooler 18, which is not in operation, through blower 19 to the heater 13. The heater operates to heat the air to between 350° F. and 400° F. This air, which is well above the boiling point of water, then flows through tower 2 to vaporize the moisture contained therein, and carry that moisture into the discharge 23. By the time the desiccant in the bottom of the tower has reached a temperature of approximately 225° F., as indicated by instrument 29, all of the moisture will have been removed from the tower. At that time, the supply of heat to the heater 13 is discontinued, and cooling water is forced through cooler 18. Also, at this time, the valve 17 is adjusted so that the discharge from the tower 2, which is now dry, is connected with the intake of the cooler 18. In this fashion, the dry air in the tower 2 is recirculated, to cool the desiccant contained therein. If air for cooling were brought in through intake 16, it could very well contain quite a bit of moisture that would be adsorbed by the desiccant to reduce its absorption power by the time it was placed on stream. When the instrument 29 indicates that the desiccant in tower 2 has reached the proper temperature, the valve 17 and the controls for the cooler and heater, shown as valves in their inlet and exhaust lines, can be operated to start the cooling cycle. As indicated diagrammatically by the dotted lines extending from the instrument to the valves of the cooler, and the heater, these parts are operated automatically by the controller when the tower temperature has reached the desired value, and start the cooling process. By the time the desiccant in tower 2 is reduced to operating temperature, the desiccant in tower 1 will have adsorbed all of the moisture that it can contain. Connecting link 26 is then moved upwardly to reverse the direction of operation of valves 6, 12, and 9. Tower 2 will then serve to dry the air while tower 1 goes through the reactivating cycle.

While the ordinary use of a dehydrator is for drying the air for various industrial uses, it can also be used to dry special atmospheres that are used in various industrial processes. For example, it can be used to dry a neutral atmosphere through which heated strip is passed while cooling, as part of an annealing process. When a dehydrator is used for this purpose, it is essential that no air gets into the system containing the special atmosphere. This is the purpose of the connection 24 extending between the outlet 11 and the cooler 18. After the desiccant has been cooled to the proper temperature, valve 25 is opened and valve 32 in a vent line 31 on the side of the tower is also opened. The special atmosphere passing through the drying tower will then also be forced through the apparatus used during the reactivating cycle to purge completely this apparatus of air, and fill the system with the special atmosphere ready to be placed on stream.

As shown in the drawing, the hot air supply to each of the towers is completely isolated from the supply of the air to be dried. Also, there is a dead air space between the valve which controls the flow of hot air and the intake to the tower. This means that there is no interchange of heat from the reactivating hot air to the air that is to be dried. Therefore, the air to be dried is maintained at any desired inlet temperature so the relative humidity thereof will not be changed. This means that the dehydrator will operate at the efficiency for which it was designed.

In the system described above, air for reactivation was drawn from an outside source, and forced through the tower during the reactivation cycle. This air removed moisture from the desiccant, and discharged it to the atmosphere. At times, particularly when a special gas is being treated, it may be desirable to use this gas during the reactivation cycle. When this is done, some means must be provided for removing the moisture from the gas after it is removed from the tower. This can be accomplished by the use of the cooler disclosed in Figure 2. In that figure, there is shown a cooler 33 through which the reactivation gas is passed. This cooler has a coil 34 for a cooling agent around it which coil will reduce the temperature of the cooler to such an extent that moisture in the gas will be precipitated. This moisture can be discharged through a suitable pipe 35. It is noted that when a special gas is being used as the reactivating gas it is necessary to have a closed circuit or path for the gas through the tower, and therefore valve 17 will be in the opposite position from that shown on the drawing.

From the above description, it will be seen that I have provided a novel arrangement of parts to be used in a dehydrator. This arrangement includes means for separating entirely the air to be dried from the reactivating air. There is also provided a circuit or path for the reactivating air which can be either opened to use atmospheric air for the reactivating process, or which can be closed to maintain some given gas in the system at all times. Provision is also made to purge the reactivated tower, with the gas being dried, prior to the time that this tower is put on stream when some other gas has been used for reactivating.

In the following claims, the term "air" is intended to include any gas that is being treated to remove the moisture therefrom.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention, as set forth in the appended claims, and that in some cases certain features of my invention may be used to advantage without a corresponding use of other features.

What is claimed is:

1. In a dehydrator, a pair of towers each filled with a drying agent, a heating device, a supply for air to be dried, each tower having an inlet with a branch thereto, a dry air outlet, a hot air outlet to atmosphere, a three-way valve operative to connect said supply with one or the other of said inlets for said towers, a second three-way valve operative to connect said heating device to one or the other of said branches to said inlets for the towers, a four-way valve operative to connect said towers alternately with said outlet for dry air and said hot air outlet, and means to operate all of said valves to connect alternately one tower with said supply and said dry air outlet and the other tower with said air heater and said hot air outlet, whereby air can be dried by the drying agent in one tower while the drying agent in the other tower is being reactivated by hot air flowing therethrough.

2. In a dehydrator, the combination of a pair of towers each filled with a drying agent, and one of which is operative to dry air while the other is being reactivated, an inlet pipe for each tower, each inlet having a branch therein, first valve means connected to said inlets and operative to direct air to be dried alternately to said towers, second valve means connected to said branches and operative to direct heated reactivating air to the branch of the inlet pipe of the tower not being supplied with air to be dried, means to insulate said second valve means and the branches of said inlets, outlets from said towers, and third valve means connected to said outlets and operative to connect said outlets alternately with an outlet for dry air and an outlet for heated air.

3. In a dehydrator, the combination of a first and a second tower each filled with a desiccant, an inlet having a branch therein for each tower, an outlet for each tower, a valve to connect alternately said inlets with a source of air to be dried, a valve to connect said outlets alternately with a discharge for dry air and a discharge pipe, with the inlet of the first tower being connected to said source when the outlet of the first tower is connected to said discharge for dry air, a heater and a cooler connected in series, an intake for said cooler and an outlet for said heater, a valve to connect said heater outlet alternately with the branches of said inlets, and a valve to connect said intake with a source of air or with said discharge pipe whereby gas flowing through the tower connected to said heater and cooler may be discharged or may be recirculated.

4. The combination of claim 3 including a connection between said discharge for dry air and said intake, a valve in said connection, and a vent in each of said towers, whereby air can be vented directly from said towers without going through the outlets thereof.

5. In a dehydrator, the combination of a first and a second tower each filled with a desiccant, a source of air to be dried, each tower having an inlet with a branch thereto, a first three-way valve operative to connect the inlet of either tower with said source, a source of heated air, a second three-way valve operative to connect said source of heated air with either of the branches to said inlets, means to insulate said branches and said second three-way valve, an outlet from each tower, a discharge pipe for dried air, a discharge pipe to atmosphere, and a four-way valve operative to connect said outlets alternately to said discharge pipe for dry air and to said discharge pipe to the atmosphere.

6. The combination of claim 5 including means to operate each of said valves in unison, said means including connections whereby when said first tower is connected by said first three-way valve and said four-way valve with said source of air to be dried and said discharge pipe for dry air, said second three-way valve will connect the branch of the inlet for said second tower to said source of heated air and said four-way valve will connect the outlet of said second tower to said discharge pipe to the atmosphere.

References Cited in the file of this patent

UNITED STATES PATENTS

| | | |
|---|---|---|
| 1,892,428 | Fonda | Dec. 27, 1932 |
| 1,948,779 | Abbott et al. | Feb. 27, 1934 |
| 2,083,732 | Moore et al. | June 15, 1937 |
| 2,345,774 | Simpson | Apr. 4, 1944 |
| 2,535,902 | Dailey | Dec. 26, 1950 |
| 2,561,441 | Lou | July 24, 1951 |